No. 880,361. PATENTED FEB. 25, 1908.
E. M. COOK.
PISTON FOR CYLINDERS OF STEAM ENGINES.
APPLICATION FILED AUG. 15, 1906.

Witnesses
Edwin G. McKee
Wm. Bagger

Inventor
E. M. Cook
By Victor J. Evans
Attorney

UNITED STATES PATENT OFFICE.

EDWARD M. COOK, OF OBERLIN, OHIO.

PISTON FOR CYLINDERS OF STEAM ENGINES.

No. 880,361.  Specification of Letters Patent.  Patented Feb. 25, 1908.

Application filed August 15, 1906. Serial No. 330,715.

*To all whom it may concern:*

Be it known that I, EDWARD M. COOK, a citizen of the United States, residing at Oberlin, in the county of Lorain and State of Ohio, have invented new and useful Improvements in Pistons for Cylinders of Steam-Engines, of which the following is a specification.

This invention relates to pistons for the cylinders of steam engines, air compressors and the like, and the object of the invention is to provide a steam and air-tight joint between the piston and the walls of the cylinder in which it operates.

With these and other ends in view which will readily appear as the nature of the invention is better understood, the said invention consists in providing a piston with expansion rings of novel and improved construction, said rings being adapted for engagement with the walls of the cylinder to constitute an air and steam-tight packing.

The invention further consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited but that changes, alterations and modifications within the scope of the invention may be resorted to when desired.

Figure 1:
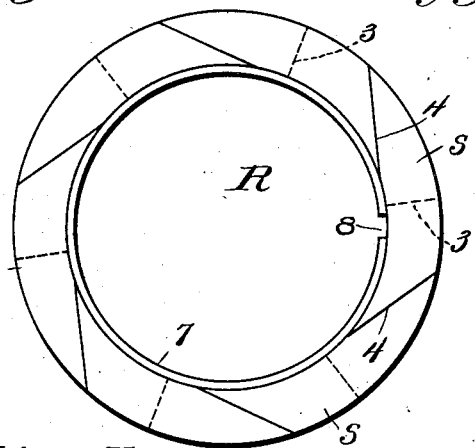
Figure 2:
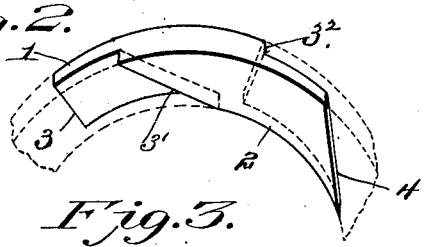
Figure 3:
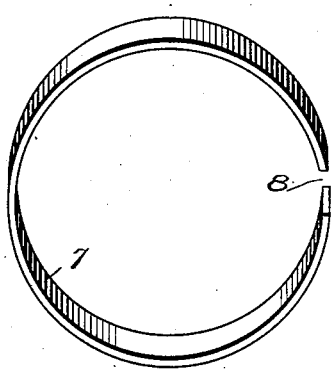
Figure 4:
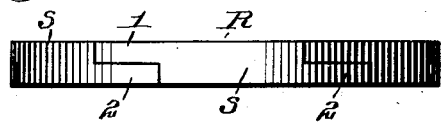
Figure 5:
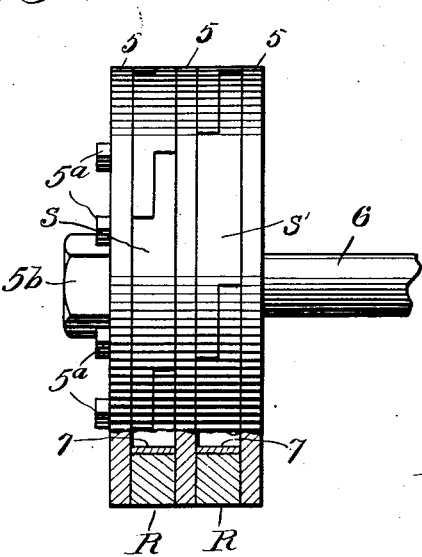
Figure 6:
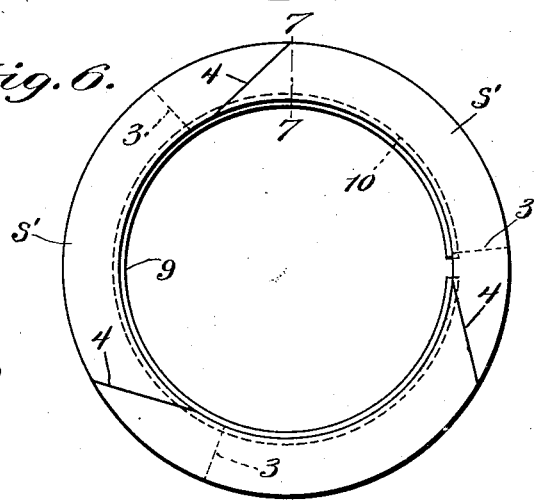
Figure 7:
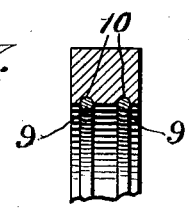

In the drawings: Figure 1 is a plan view of a piston ring embodying the invention. Fig. 2 is a perspective detail view of one of the segments or sections entering into the construction of the piston ring. Fig. 3 is a perspective detail view of an expansion spring used in connection with the ring. Fig. 4 is a side elevation of the piston ring. Fig. 5 is a side elevation of a piston embodying in its construction a plurality of the improved rings. Fig. 6 is a plan view illustrating a piston ring of slightly modified construction. Fig. 7 is a sectional detail view taken on the plane indicated by the line 7—7 in Fig. 6.

Corresponding parts in the several figures are denoted by like characters of reference.

The improved piston ring R is made up of a plurality of segments or sections of which any desired number may be used; thus in Fig. 1 of the drawings a ring composed of six segments S, S has been shown, while Fig. 6 illustrates a ring composed of only three segments, here designated S'.

Each segment S or S' is composed of two members or parts 1 and 2 disposed in parallel relation and each integrally joined at its inner end to the inner end of the other; one set of members forming one side and the other set the opposite side of the body of the ring. The outer ends of the members 1 and 2 project in opposite directions, and the segments when assembled fit together in such a manner as to break joint. The ends of one member, 1, are cut radially to the ring as indicated at 3 while the ends of the companion member 2 are approximately tangential to the ring as indicated at 4. The ends 1 thus constitute stops to limit the inward movement of the segments which constitute the ring, while the ends 4 form scarf joints and contact faces on which the segments are adapted to ride as the ring expands and contracts under variations of temperature and to compensate for wear.

P in Fig. 5 of the drawings designates a piston which is made up of a plurality of plates 5, 5 connected or assembled by the piston rod 6; the improved piston rings being interposed between the plates 5, 5; any desired number of the piston rings R, from one upward, may be employed in the make up of the piston. Each ring is provided with an expansion spring which, as illustrated in Figs. 1 and 3 of the drawings may consist of a plain annular band open on one side as at 8, and which has a tendency to expand in size. The spring 7 will serve to expand the piston ring, forcing the segments into engagement with the walls of the cylinder in which the piston operates, the spring being confined between the piston plates 5, 5. The plates 5 are in the form of disks and they are held together to clamp the packing rings between them by means of bolts 5ª, which pass through the plates at points inside the packing rings. A nut 5ᵇ is applied to the end of the rod 6 to further clamp the plates against the packing rings.

Under the modified construction illustrated in Figs. 6 and 7 of the drawings, each piston ring is provided with a plurality of expanding springs, here designated 9, said springs being constructed of a resilient wire of circular cross section; the segments S' composing the ring are in this instance provided with grooves 10 upon their inner faces forming seats for the rings 9 which are thereby secured against displacement.

I wish it to be understood that the opposite ends of the segmental members are cut-away to provide reversely arranged recesses, one of which is squared at its terminal and inwardly inclined into the body of the segment approximately the length thereof, so as to provide a slanting shoulder $3^1$, the recess on the opposite end of the segment has its terminal downwardly and outwardly inclined to provide a pointed end, said recesses is further provided with a squared shoulder $3^2$, in the body of the segment.

Having thus described the invention what is claimed is:

A piston comprising the rod with a plurality of plates thereon, rings constructed in segmental form and interposed between the plates, each of said segments having their opposite ends cut-away to provide reversely arranged recesses, one of which is provided with a squared terminal and also with an inwardly inclined shoulder which extends approximately the length of the body of the segment, the recess at the other end of the segment having a squared shoulder formed in the body of the segment, the terminal of said recess being arranged downwardly and outwardly inclined with a pointed end, expansible and contracting springs arranged on the inner surfaces of the rings, and means for securing the plates and rings together, substantially as specified.

In testimony whereof, I affix my signature in presence of two witnesses.

EDWARD M. COOK.

Witnesses:
 LOUIS E. BURGNER,
 HARRIETT E. BURGNER.